United States Patent
Akai et al.

(10) Patent No.: US 7,047,052 B2
(45) Date of Patent: May 16, 2006

(54) CELLULAR PHONE TERMINAL

(75) Inventors: Hiroshi Akai, Fujisawa (JP); Yoshinori Suzuki, Saitama (JP); Shigehisa Motowaki, Hitachi (JP); Junji Nakata, Sagamihara (JP); Takeshi Hoshino, Kodaira (JP); Toyota Honda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 404 days.

(21) Appl. No.: 10/286,138

(22) Filed: Oct. 31, 2002

(65) Prior Publication Data

US 2004/0204194 A1    Oct. 14, 2004

(30) Foreign Application Priority Data

Jul. 19, 2002   (JP)   .............. 2002-210371

(51) Int. Cl.
    *H04B 1/38*    (2006.01)
(52) U.S. Cl. ............... 455/575.1; 455/350; 455/414.4; 370/392; 381/17; 704/275
(58) Field of Classification Search ............ 455/575.1, 455/99, 416, 414, 350, 414.4; 381/17, 77; 370/392; 348/14.1; 704/275
See application file for complete search history.

(56) References Cited

U.S. PATENT DOCUMENTS

| | | | |
|---|---|---|---|
| 2002/0057333 A1* | 5/2002 | Mayuzumi | 348/14.1 |
| 2002/0095292 A1* | 7/2002 | Mittal et al. | 704/270 |
| 2002/0196947 A1* | 12/2002 | Lapicque | 381/17 |
| 2003/0083024 A1* | 5/2003 | Richenstein et al. | 455/99 |
| 2003/0096603 A1* | 5/2003 | Chen | 455/416 |
| 2003/0182130 A1* | 9/2003 | Sun et al. | 704/275 |
| 2004/0131201 A1* | 7/2004 | Hundal et al. | 381/77 |
| 2004/0202167 A1* | 10/2004 | Jonsson et al. | 370/392 |
| 2004/0248625 A1* | 12/2004 | Yoshida et al. | 455/575.1 |

FOREIGN PATENT DOCUMENTS

| | | |
|---|---|---|
| JP | 2000-184017 | 6/2000 |
| JP | 2001-054085 | 2/2001 |
| JP | 2001-274912 | 10/2001 |
| JP | 2002-118642 | 4/2002 |

* cited by examiner

*Primary Examiner*—Lester G. Kincaid
*Assistant Examiner*—Phuoc Doan
(74) *Attorney, Agent, or Firm*—Townsend and Townsend and Crew LLP (57) ABSTRACT

Conventionally, there is a description about stereophonically reproducing downloaded musical pieces or those stored on a memory card. A call speech is supported in monaural only. A realistic telephone call using stereo sound has been unavailable. The present invention aims at providing a cellular phone capable of a telephone call using stereo sound. The cellular phone terminal capable of speech communication with another information processing terminal. The cellular phone terminal is configured to comprise: a plurality of speakers for the speech communication; a receiver to receive a speech signal from a plurality of microphones of the other information processing terminal; and a processor to provide control so that the plurality of speakers can output the speech signal received by the receiver.

8 Claims, 11 Drawing Sheets

CELLULAR PHONE TERMINAL

FIELD OF THE INVENTION

The present invention relates to speech communication of, for example, a cellular phone, the PHS, a PDA (Personal Digital Assistant), PCS (Personal Communications Services), etc.

BACKGROUND OF THE INVENTION

Presently, there is developed a technology of stereophonically reproducing a musical piece downloaded or stored in a memory card. For example, such technology is described in Japanese Patent Laid-open (Kokai) No. 2002-118642.

However, the above-mentioned prior art only supports the monaural call speech and does not sufficiently examine a realistic telephone call using stereo sound. Particularly, full consideration is not given to realistic conversation using a video telephone or the like.

SUMMARY OF THE INVENTION

It is therefore an object of the present invention to provide a cellular phone terminal capable of a realistic telephone call on a video telephone.

In order to achieve the above-mentioned object, the present invention is configured as defined by the appended claims. In the claims, music-related data means, for example, a ring melody, an MP3 file, a movie, a musical piece, a game, a TV program, a commercial message, an advertisement, image information (motion and/or still pictures) captured by an digital camera, etc. Other information processing terminals include, for example, a cellular phone, the PHS, a PDA (Personal Digital Assistant), PCS (Personal Communications Services), a PC, etc. Obviously, the speech is not limited to a speaker's voice, but may be an ambient sound and the like, for example.

Other and further objects, features and advantages of the invention will appear more fully from the following description.

BRIEF DESCRIPTION OF THE DRAWINGS

FIGS. 1(1) through (4) are configuration block diagrams according to a first embodiment;

FIGS. 3(1) through (3) show data structures corresponding to each speech mode;

FIGS. 4(1) and (2) illustrate processing according to a third embodiment;

FIGS. 5(1) and (2) diagram operations according to a fourth embodiment;

FIGS. 7(1) through (4) illustrate case bodies according to the fifth embodiment;

FIGS. 8(1) and (2) show relationship between a distance measured by a distance sensor 202 and a speaker volume and diagrams processing according to a sixth embodiment; and FIGS. 9(1) through (9) show speakers according to the seventh embodiment.

DETAILED DESCRIPTION OF THE PREFERRED EMBODIMENTS

A first embodiment of the present invention will now be described. The following description explains a cellular phone capable of stereo sound. The same constituent components in the following drawings are designated by the same reference numerals.

FIG. 1(1) is a configuration block diagram of the cellular phone according to the first embodiment. FIG. 1(2) shows an example of a front view of the cellular phone with a screen according to the embodiment. In the following description, the cellular phone's top, bottom, left, and right are defined with reference to the screen viewed from the front as shown in FIG. 1(3). FIG. 1(4) shows an example of a rear view of the cellular phone according to the embodiment.

The speech-related configuration will now be described first. A stereophonic microphone 101 is built in a cellular phone's case body. There are provided two microphones 101. It is assumed that a speech signal input from one microphone is R data and a speech signal input from the other microphone is L data. As shown in FIG. 1(2), for example, the microphones 101 are arranged right and left below an operation keypad 110. It is desirable to provide a certain interval between the right and left microphones because a wide range of sound can be picked up.

A speech data compression section 102, that is, a speech data compressor converts the R and L data supplied by the microphones 101 to digital signals and compresses these signals. The speech data compression section 102 then outputs the compressed speech signals, R' and L' data, to a CPU 106. The CPU 106 performs processing for sending the input R' and L' data to a communicating party via an RF unit 107. Thus, the RF unit 107 functions as a transmitter.

A speech data decompression section 103, that is, a speech data decompressor decompresses the received R' and L' data to the R and L data. The decompressed data is output to a call-compliant speaker 104 (hereafter referred to as the "stereo speaker") or a headphone jack 105. Here, it is assumed that there are provided two stereo speakers 104. As shown in FIG. 1(2), for example, these stereo speakers are arranged right and left above the top side of the display section 108. Accordingly, data input from the microphones 101 can be output in stereo. A user can enjoy a realistic call, for example, in video telephone mode to be described. That is, the cellular phone can receive two channels (R and L) of input. Each channel can be output in stereo through an independent speaker.

When a user makes a call by holding the cellular phone near his or her ear, he or she may feel a sense of incongruity or the difficulty in listening. This is partly because one-to-one correspondence is not made between the ear and the speaker when the stereo speakers 104 reproduce a speech signal. In such case, it is desirable to use a speaker 201 for monaural reproduction (hereafter referred to as the "monaural speaker") provided independently of the stereo speakers 104. Since the received speech signal is a 2-channel speech in stereo, the monaural speaker is controlled to output either the R data or the L data, or synthesized data of the R and L data.

On the contrary, a sense of incongruity or the difficulty in listening is negligible when the user makes a video telephone call or the like by watching the display section 108. It may be preferable to use not only two stereo speakers 104 as mentioned above, but also three speakers including the monaural speaker 201 for calling. In this case, for example, the CPU 106 outputs the compressed R' and L' data supplied by the microphone 101 to the stereo speakers 104, respectively. The CPU 106 combines the R' data with the L' data and outputs the combined data (e.g., R'+L') to the monaural speaker 201. Since three speakers can be used to output a speech signal, it is possible to expect a more realistic call.

A musical sound speaker 203 is used for reproducing a ring melody, a music file, etc. stored in memory 109. Here, it is assumed that there are also provided two musical sound speakers 203. As shown in FIG. 1(4), for example, the musical sound speakers 203 are configured to generate a speech signal from the rear of the case body so as to allow the sound to be listened optimally even if a folding cellular phone is closed. Even if such cellular phone is closed, this configuration can use a musical data decompression section 204 to decompress an incoming call notification sound or an MP3 compressed music file and reproduce the sound in stereo. The CPU 106 determines whether a call speech or a music file should be reproduced, and selects a necessary speaker.

The configuration in FIG. 1 provides five speakers. All of the five speakers may be used for calling or for musical pieces such as music files. In this case, for example, the CPU 106 provides control to output a speech signal received via the RF unit 107 or stored in the memory 109 to the stereo speakers 104, the monaural speaker 201, and the musical sound speakers. Thus, the RF unit 107 functions also as a receiver.

When five channels (e.g., R, L, R-surround, L-surround, and center) of a speech signal are handled, the above-mentioned five speakers can be assigned to the respective channels one by one, enabling the user-requested sound quality. In this case, the CPU 106 determines which speaker should be used to output one of the five channels of the speech signal. The channel is output corresponding to the predetermined speaker. For example, control is provided to output R/L data from the musical sound speakers, R/L surround data from the stereo speakers 104, and center data from the monaural speaker 201.

Then, the video-related configuration will now be described. A camera 111 captures a scene around the cellular phone into the cellular phone. The captured video signal is compressed in a video data compression section 112 and is output to the CPU 106. The CPU 106 stores the compressed video signal in the memory 109 and sends the stored video signal to a communicating party via the RF unit 107. Alternatively, the compressed video signal is directly sent to the communicating party via the RF unit.

When receiving data including a video signal from the RF unit 107, the CPU 106 stores the received video signal in the memory 109 and outputs the stored vide signal to a video data decompression section 113. The video data decompression section 113 decompresses the video signal and outputs it to the display section 108. Alternatively, the received video signal is directly output to the video data decompression section 113.

A distance sensor 202 measures a distance between the cellular phone and a human body and is used to determine a user s call mode etc. as will be described later.

In addition to the above-mentioned processing, the CPU 106 is responsible for the overall processing of the cellular phone based on a key input signal or the like entered from the operation keypad 110.

Figure 1:
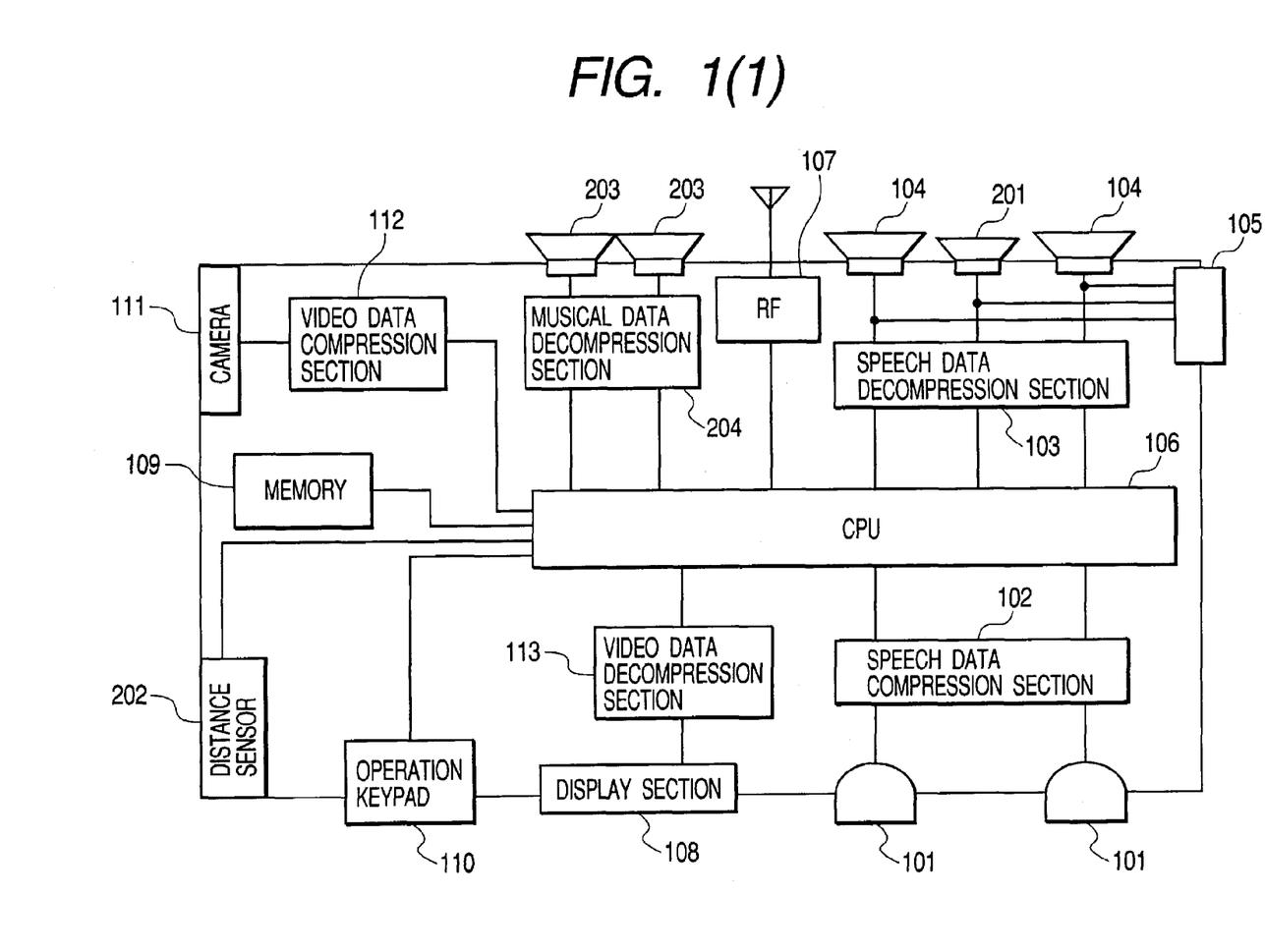
Figure 3:
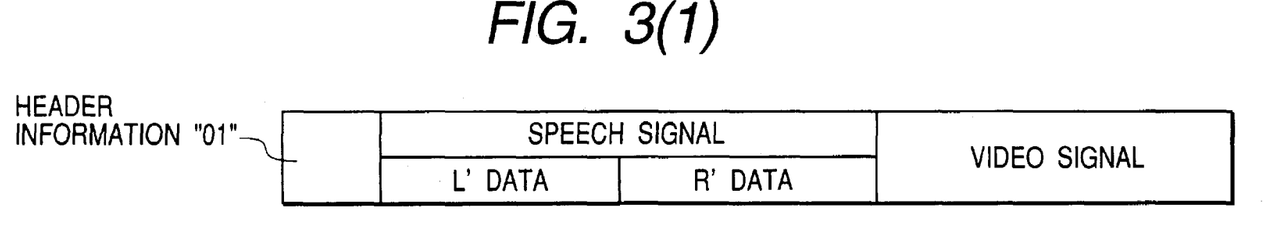

The following describes an example of making a call by using the cellular phone according to the configuration in FIG. 1. The cellular phone shown in the figure is assumed to be capable of a video telephone mode and a normal call mode as available call modes. The video telephone mode allows a user to make a call by watching a video captured by the camera 111. For example, the video telephone mode uses a data structure as shown in FIG. 3(1) to communicate a speech signal and a video signal. The normal call mode allows a user to make a call by putting the cellular phone to his or her ear as conventionally practiced. For example, the normal call mode uses a data structure as shown in FIG. 3(2) to communicate a speech signal. The cellular phone is configured to choose between the video telephone mode and the normal call mode. Each mode is selected by a selection means, that is, a selector such as a special button provided on the operation keypad 110 or a display screen. When the mode is selected through this selector, information indicating the selected mode is included as header information as shown in FIG. 3.

A stereo format or a monaural format can be chosen as the speech format. In this case, for example, the header information is provided with an identifier for determining whether the stereo format or the monaural format should be used for output. Based on the identifier, the CPU 106 at the receiving side determines whether the stereo speaker 104 or the monaural speaker 201 is to be used to output the speech signal.

Figure 2:
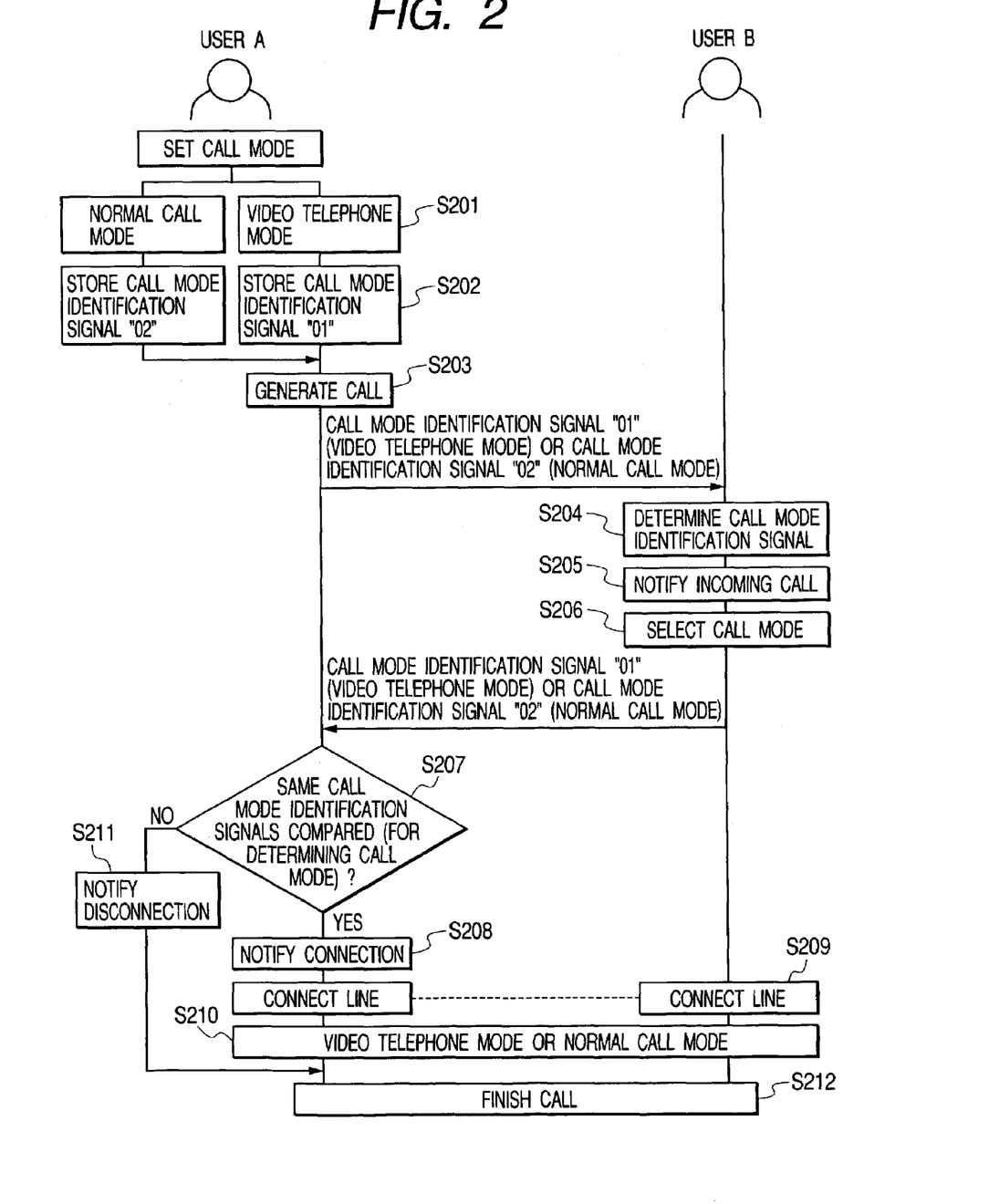
FIG. 2 shows processing of cellular phones according to the first embodiment.

Referring now to FIG. 2, the following describes an example in which users A and B own the cellular phones according to the embodiment (cellular phones A and B, respectively) and user A originates a call to user B.

First, the following describes a case where user A requests user B to make a call in the video telephone mode and user B permits the request. Since user A wishes for a call in the video telephone mode, user A specifies the video telephone mode as the call mode for cellular phone A through the use of a selector such as the operation keypad 110 (S201). When the video telephone mode is specified, a call mode identification signal "01" indicating the video telephone mode is stored in the memory 109 via the CPU 106 (S202). When a call origination instruction to cellular phone B is entered from the operation keypad 110, the CPU 106 recognizes the call origination signal and performs the call origination to cellular phone B (S203). At this time, cellular phone A sends at least the call mode identification signal "01" stored in the memory 109 to cellular phone B.

When receiving the call mode identification signal "01", the CPU 106 of cellular phone B recognizes the call mode identification signal (S204). The CPU 16 notifies the display section 108 or the like of the contents of the recognized call mode identification signal, i.e., which call mode has terminated (S205). A notification means may be capable of distinction between the normal call mode and the video telephone mode in such a manner as to output a character message or the like previously stored in the memory to the display section 108 or to generate different ringing tones for the respective modes from the musical sound speaker 203.

Then, when user B uses the operation keypad 110 to select the video telephone mode (S206), the call mode identification signal "01" is stored in the memory 109 via the CPU 106 of cellular phone B. In addition, the call mode identification signal "01" stored in the memory 109 is sent to cellular phone A.

The CPU 106 of cellular phone A compares the call mode identification signal "01" received from cellular phone B via the RF unit 107 with the call mode identification signal "01" stored at S202 (S207). Since the call mode identification signal "01" stored at S202 is the same as that received from user B, the CPU 106 notifies the display section 108 of permission of the call in the video telephone mode requested by user A (S208). The CPU 106 performs line connection processing to establish the call in the video telephone mode indicated by the call mode identification signal "01" (S209).

In the video telephone mode, the CPU 106 of cellular phone A communicates with the CPU 106 of cellular phone B by using the data format as shown in FIG. 3(1) (S210)

Namely, this data format includes the speech signals (R' and L') supplied by the two microphones 101 and the video signal captured by the camera 111 provided with the header information of the call mode identification signal "01" stored in the memory 109. In other words, to the communicating party, cellular phone A sends data comprising the R' and L' data supplied by the microphone 101 and compressed in the speech data compression section 102 and the video signal supplied by the camera 111 and compressed in the video data compression section provided with the header information "01" indicating the video telephone mode.

When the above-mentioned data is received from the communicating party via the RF unit 107, the received R' and L' data are decompressed to the R and L data in the speech data decompression section 103. Further, the R and L data are converted to analog signals and are reproduced stereophonically through the stereo speakers 104. In this case, it is assumed that the header information is provided with the identifier indicating the stereo call. Based on the identifier, the receiving CPU 106 provides control to output the speech signal to the stereo speaker 104, not to the monaural speaker 201.

The received video signal is decompressed in the video data decompression section 113 and is output to the display section 108.

When either user issues an instruction to hang up the phone, the line is disconnected to hang up (S212).

According to the above-mentioned configuration, a speech signal is supplied by two microphones and is output to two stereo speakers for calling, allowing a call speech to be reproduced in stereo. The user can enjoy a realistic call by watching the video during a video telephone conversation, a television conference, etc. When there is a plurality of communicating parties, it is possible to easily determine who is the speaker and where the call is originated. In addition, it is possible to easily sense a change of sound around the communicating party's terminal.

The above-mentioned embodiment has described the call in the video telephone mode. Almost the same processing as mentioned above is performed when user A requests user B to make a call in the normal call mode and user B permits the request. In this case, the call mode identification signal is set to "02" indicating the normal call mode. The communication data format is as shown in FIG. 3(2). It is preferable not to send or receive a video signal.

In the above-mentioned embodiment, user B permits a call in the call mode requested by user A. Although user A requests a call in the video telephone mode, user B may reject it, or may select the normal call mode. The following describes processing in this case.

When user B selects the normal call mode at S205 in FIG. 2, the call mode identification signal "02" is stored in the memory 109 via the CPU 106 of cellular phone B. Further, the call mode identification signal "02" stored in the memory 109 is sent to cellular phone A.

When cellular phone A receives this call mode identification signal "02", the CPU 106 of cellular phone A performs processing to store the call mode identification signal "02" received from cellular phone B in the memory 109. The call mode identification signal "01" stored in the memory 109 at S202 is compared with the stored call mode identification signal "02" received from cellular phone B (S207). Here, the call mode identification signal "01" stored in the memory 109 at S202 differs from the stored call mode identification signal "02" received from cellular phone B. Cellular phone A is notified of rejection of a call in the video telephone mode requested by user A (S211). If user A permits the normal call mode, a call is made in this mode (S210). If user A rejects the normal call mode, no line connection is made to finish the call (S212).

Although user A requests a call in the normal call mode, user B may reject it, or may select the video telephone mode. Also in this case, the similar processing is performed.

The above-mentioned example determines whether or not requests for the call mode match between users A and B. Based on the determination result, user A or B determines whether or not to make a call in the requested mode. In addition to this method, a call terminator (user B) can determine a call mode independently of the call mode requested by a call originator (user A). For example, even when the call originator requests the video telephone mode, the call terminator can select the normal call mode to forcibly initiate a call in the normal call mode. When a user does not want to send his or her picture or remaining battery power is low, the capability of selecting the normal call mode improves usability. Likewise, even when the call originator requests the normal call mode, the call terminator can select the video telephone mode to forcibly initiate a call in the video telephone mode. It is possible to easily identify who is a call originator, ensure a safe call, and prevent a malicious call.

In addition, the power of decision can be given to the call originator, not to the call terminator. A call can be forcibly made in the speech mode selected by the call originator. In these cases, it is obviously unnecessary to store the call mode identification signal (S202) or compare the call mode identification signals (S207).

In this situation, cellular phone B receiving a call performs call processing in the speech mode according to the call mode identification signal generated from cellular phone A (S210). There is an advantage of being able to make a call in the speech mode intended by the call originator (user A in this example).

Furthermore, at S208 in FIG. 2, the display section 108 of cellular phone A is notified of permission of a call in the video telephone mode requested by user A. The embodiment may be configured to allow user A to determine whether to actually initiate a call in the video telephone mode or to change to the normal call mode.

This makes it possible to confirm the notification then select the next action. Consequently, the user can reliably perform operations with improved usability. If the requested speech mode is rejected, the user can easily change the speech mode without reentering a telephone number. This is very convenient for users.

In the above-mentioned embodiment, the sound formats are selectable for each call mode. In addition, for example, the sound format may be predetermined for each call mode such as stereo reproduction in the video telephone mode and monaural reproduction in the normal call mode. In the monaural reproduction, the sender's cellular phone (CPU 106) performs processing so as to operate only one of the two microphones 101. As shown in FIG. 3(3), for example, the compressed R' or L' data supplied by either microphone is sent to a communicating party via the RF unit 107.

The above-mentioned embodiment has described that only one of the two microphones is operated. However, it may be preferable to operate both of the two microphones 101, and transmit a combination of the R' and L' data (e.g., R'+L') input from each microphone to the communicating party through the use of the above-mentioned format in FIG. 3(3).

Moreover, the speech data compression section 102, the speech data decompression section 103, the video data compression section 112, the speech data decompression section 113, and the musical data decompression section 204 in FIG. 1 are configured independently. These sections may be configured as a single component. The CPU may be responsible for compressing and decompressing data. In this case, it is possible to reduce the circuit scale.

Concerning the number of speakers, there are provided five speakers in total: two stereo speakers 104, one monaural speaker 201, and two musical sound speakers 203. However, the present invention is not limited thereto. For example, the monaural speaker 201 may not be used. In this case, there is no need for an identifier to determine a speaker as the speech signal output destination as will be described later.

A second embodiment of the present invention will now be described. While the above-mentioned embodiment has described the example of intactly processing the R and L data input from the micro phone 101, the present invention is not limited thereto. The second embodiment describes communication according to a sum and a difference between the R and L data.

The following describes the processing according to the second embodiment. When the R and L data are input from the microphone 101, the CPU 106 converts the data into a sum signal (R+L) and a difference signal (R−L). The speech data compression section 102 compresses these signals to generate compressed data (R+L)' and (R−L)' which are then sent to the communicating party via the RF unit 107.

When a speech signal is received from the communicating party, the compressed data (R+L)' and (R−L)' are received via the RF unit 107. The speech data decompression section 103 decompresses the data to the (R+L) and (R−L) data. Then, the CPU 106 restores these data to the original R and L data. More specifically, the R data is obtained by finding a sum of (R+L) and (R−L) and dividing the sum by 2. The L data is obtained by finding a difference between (R+L) and (R−L) and dividing the difference by 2. The R and L data obtained in this manner are converted into analog signals that can be reproduced from the stereo speakers 104.

Conventionally, it is a general practice to use the (R+L) data for communication during a monaural call. There is an advantage of using existing facilities when a stereo call is provided according to the communication based on the (R+L) data structure as mentioned above. Since the R and L data are similar to each other, the (R−L) data approximates to zero, decreasing communication costs.

Figure 4:
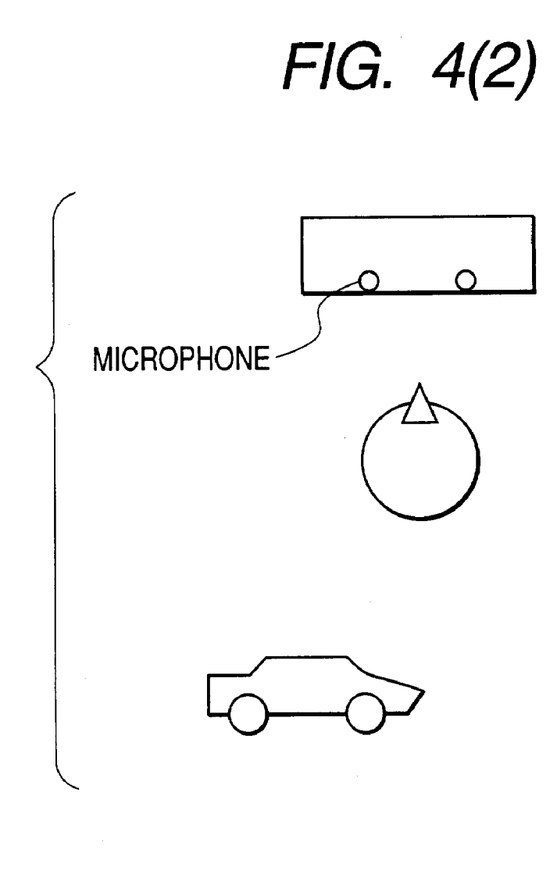

A third embodiment of the present invention will now be described. The following describes an example of processing for a speech signal reproduced in the stereo speakers 104. The processing will be explained specifically with reference to FIG. 4. As shown in FIG. 4(2), it is assumed that a car passes from the left to the right behind a sender. The display section 108 on the communicating party's cellular phone in FIG. 4(1) displays the sender and the car running therebehind. In this case, the cellular phone in FIG. 4(2) picks up the sound in accordance with the left-to-right movement of the car. For realistic reproduction, the corresponding cellular phone in FIG. 4(1) needs to reproduce the sound from the right speaker first and then from the left speaker so as to provide an effect of moving sound.

The following describes control to use the communicating party's left speaker to reproduce the sound input from the right microphone of the sender's cellular phone and to use the communicating party's right speaker to reproduce the sound input from the sender's left microphone.

Data according to the format in FIG. 3(1) is sent to the communicating party via the RF unit 107. The data comprises the header information "01"; R' and L' data input from the microphone 101 and compressed in the speech data compression section 102; and a video signal input from the camera 111 and compressed in the video data compression section 112.

When data is received from the communicating party, the compressed data R' and L' are received via the RF unit 107. The speech data decompression section 103 decompresses the received data to the R and L data. The R and L data obtained in this manner is converted into analog signals that can be reproduced from the two stereo speakers 104 for calling. At this time, the CPU 106 provides control to output the R data to the left speaker and the L data to the right speaker.

When a car passes behind the sender, for example, it becomes possible to reproduce the ambient sound from the right and left stereo speakers 104 in accordance with the movement of the speech signal, providing a very realistic call.

A fourth embodiment of the present invention will now be described. While the above-mentioned embodiment is configured to allow user B to select the call mode upon reception of an incoming call, the present invention is not limited thereto. The embodiment may be configured to change the call mode during a call.

Figure 5:
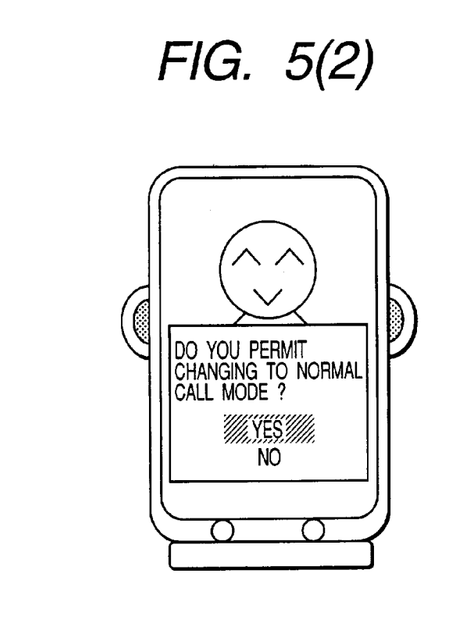

The following describes processing in this case with reference to FIG. 5. For example, the following situation is supposed. Users A and B are calling in the video telephone mode. In the middle of the call, user A becomes anxious about the remaining amount of battery charge and requests to change the call mode to the normal call mode from the video telephone mode.

During the call, user A presses a special button or the like for the normal call mode to request to change the call mode. The call mode identification signal "02" is stored in the memory 109 via the CPU 106 of cellular phone A and is sent as a call mode changeover request signal to cellular phone B (S411).

Upon reception of the call mode changeover request signal, cellular phone B stores the received call mode identification signal "02" in the memory 109 and issues a notification prompting the call mode changeover (S412). User B determines whether or not to accept the changeover request (S413) When user B accepts the changeover request and set the call mode to the normal call mode using the special button or the like, the call mode identification signal "02" is input to the CPU 106. When receiving the call mode identification signal "02", the CPU 106 sends the call mode identification signal "02" as a call mode changeover permission signal stored in the memory 109 to cellular phone A.

When receiving the call mode changeover permission signal, cellular phone A changes the header information "01" to "02" stored in the memory 109. In order to use the data format as shown in FIG. 3(2) for communication, for example, cellular phone A stops operations of the camera 111 and prevents a video signal supplied by the camera 111 from being used for the communication. Consequently, the cellular phones of users A and B can communicate with each other in the normal call mode as user A requested (S414).

At S413, user B may reject the user A's request to change to the normal call mode. In such case, cellular phone B sends the call mode identification signal "01" stored at S206 in FIG. 2 as a call mode changeover rejection signal to cellular phone A. When receiving the call mode changeover rejection signal, cellular phone A is controlled to maintain the call in the current video telephone mode (S414) because the call mode identification signal "02" stored at S411 differs from the call mode changeover rejection signal "01".

When the call mode changeover permission signal is not received within a specified time, it is assumed that the communicating party rejects the call in the requested call mode. Like the case where the call mode changeover rejection signal is received, the processing is performed to continue the call in the current video telephone mode.

The video telephone mode can be changed to the normal call mode if the communicating party permits to do so. This can improve the usability, for example, when the remaining amount of battery charge becomes low or the communication state of a motion picture becomes degraded during a speech call.

Obviously, the normal call mode can be changed to the video telephone mode. In this case, the user can confirm the communicating party in the normal call mode, and then change to the video telephone mode. This makes it possible to prevent a video telephone call with an unintended communicating party.

At S412, an intention to change the call mode may be notified to the communicating party by voice during the call. Further, for example, the display section 108 may display a notification message such as "call mode changeover requested" as shown in FIG. 5(2). In this case, for example, when pressing a button for indicating the call mode changeover, a signal showing such indication is sent to the communicating party's cellular phone. When the communicating party's cellular phone receives that signal, its CPU 106 performs processing to display a message already stored in the memory 109 on the display section 108. This makes it possible to reliably notify the communicating party of a request to change the call mode, improving the usability of calling.

A fifth embodiment of the present invention will now be described. Here is described a case of using the incoming phone-call speaker as a musical sound speaker. The configuration block diagram is the same as that in FIG. 1 except that the musical sound speaker 203 is not mounted because the stereo speaker 104 also functions as the musical sound speaker 203.

FIG. 1(2) illustrates an example of separately mounting the stereo speakers 104 and the musical sound speakers 203. In this example, the stereo speakers 104 are arranged on the front of the cellular phone with the case body opened so as to efficiently transmit the sound to a user in the video telephone mode or the like. On the other hand, as shown in FIG. 1(4), the musical sound speakers 203 are arranged on the rear of the case body so as to easily hear the ring tone or the like in a mobile situation or the like. When the stereo speaker 104 also functions as the musical sound speaker 203 as described in the present embodiment, however, the musical sound speaker 203 arranged on the rear of the cellular phone becomes unnecessary. If the arrangement of the stereo speakers 104 is unchanged, closing the cellular phone makes it difficult to hear the sound such as the ring tone, a reproduced music file, etc. The present embodiment describes the configuration capable of well audibly reproducing a music file such as the ring tone with the cellular phone closed or a call speech with the cellular phone opened.

Figure 7:
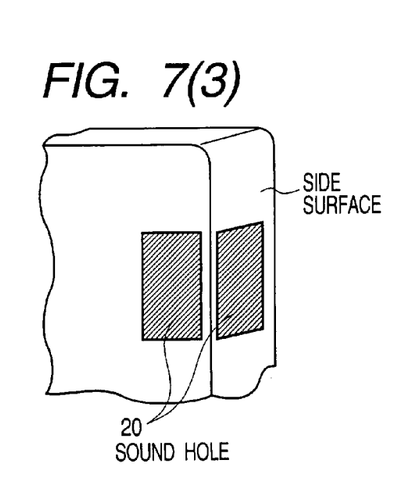
Figure 8:
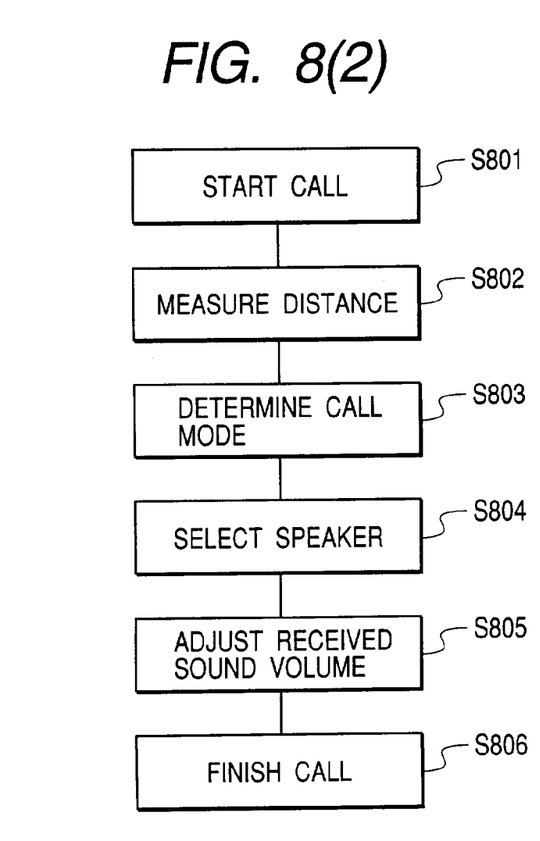

FIG. 7 illustrates an example of the speaker arrangement according to the present embodiment. FIG. 7(1) three-dimentionally shows the state of the cellular phone according to the present embodiment. As shown in FIG. 7(1) the case body having the display section 108 is defined to be a case body A; a surface having the display section 108 to be a display surface 11; the case body having the operation keypad 110 to be a case body B; and a surface-having the operation keypad 110 to be an operation surface 12. The term "side surface" means a surface joining the display surface 11 and the rear surface opposite thereto. The side surface viewed from the top of the case body A is defined to be a top side surface 14; the side surface viewed from the bottom of the case body B is defined to be a bottom side surface 15; and the side surface viewed from the left or right of the cellular phone to be a left/right side surface 13. The directions of top, bottom, left, and right are the same as those defined in FIG. 1(3).

FIG. 7(2) shows the cellular phone viewed from the left/right side surface 13. The cellular phone is closed via a hinge section 10. The display section 108 is illustrated with a broken line because the display section 108 is actually invisible from the side.

As shown in FIGS. 7(1), (2), and (3), the embodiment positions sound holes 20 of the stereo speakers 104 on the display surface 11 and the left/right side surface 13 of the case body A. FIG. 7(3) is an enlarged view of the encircled portion in FIG. 7(1). The sound hole here signifies a hole for outputting a speech signal generated from a speaker's sound source toward the outside of the case body. It is desirable to arrange the speaker's sound source, though not shown in the figure, with almost the same distance from the sound holes in the case body A.

When the speaker's sound holes are configured as mentioned above, the sound hole on the display surface 11 can output the sound with the cellular phone opened. The side sound hole on the left/right side surface 13 or the like can output the sound with the cellular phone closed. Accordingly, it becomes possible to well audibly reproduce a music file such as the ring tone with the cellular phone closed or a call speech with the cellular phone opened.

FIG. 7(4) shows an example of the sound hole formed to cover the display surface 11, the left/right side surface 13, and the top side surface 14. Forming the sound hole in this manner eliminates an obstacle between the sound holes to the sound from the sound source, efficiently outputting the sound from the sound source. Since the sound hole is positioned on the top side surface 14, the sound can be output not only from the left/right side surface 13, but also from the top side surface 14. This further improves the audibility of the ring tone or the like when the cellular phone is closed.

For the above-mentioned reason, the similar configuration applies to the example of arranging the sound holes on the display surface 11 and the left/right side surface 13 as shown in FIG. 7(3). It may be preferable to continuously form the speaker's sound hole on the display surface 11 and the left/right side surface 13.

The positions of the sound holes 20 for the stereo speakers 104 are not limited to the present embodiment but may be determined so as to well audibly reproduce the ring tone or the like with the cellular phone closed. When the stereo speakers 104 are provided at the bottom of the case body having the operation keypad 110, for example, the sound hole may be positioned on the bottom side surface 15. The sound hole on the display surface 11 need not be as large as that on the left/right side surface 13. As the need arises, the sound hole on the display surface 11 may be larger than that on the left/right side surface 13, and vice versa.

Figure 6:
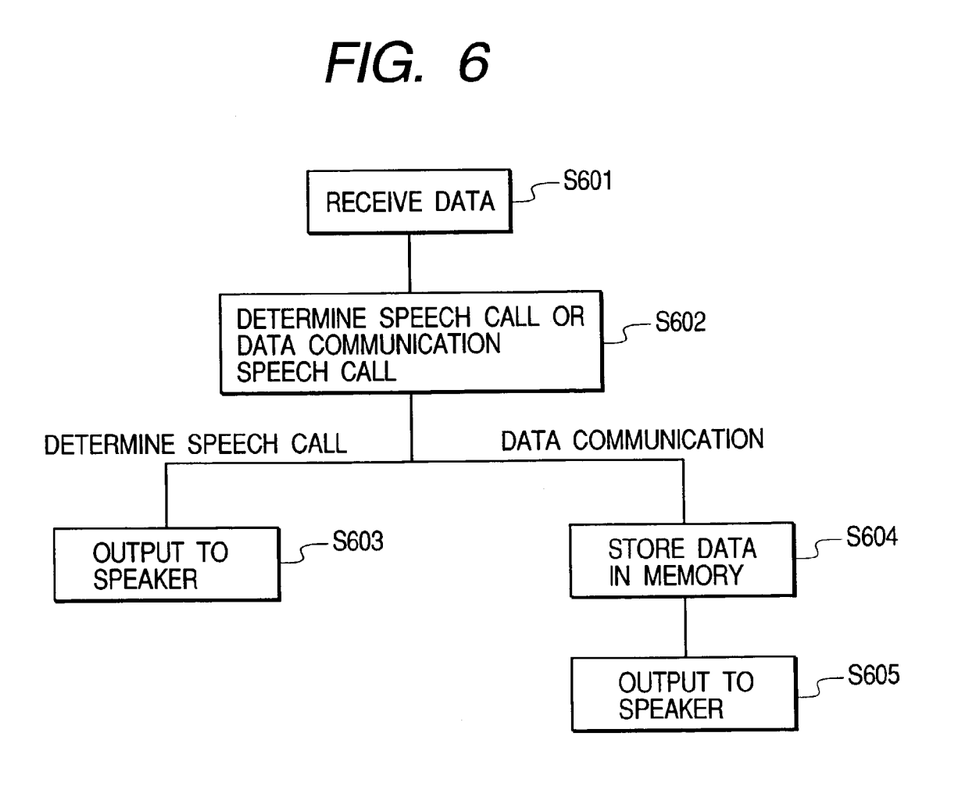
FIG. 6 diagrams processing according to a fifth embodiment.

FIG. 6 shows specific processing according to the present embodiment. The RF unit 107 receives data (S601). Based on the data, the CPU 106 determines whether the data is associated with a speech call (telephone call) or data communication (S602) The data is a speech signal received via the RF unit 107. When determining the received speech data signal to be associated with the speech call, the CPU 106 allows the speech data decompression section 103 to decompress that signal so that it can be reproduced from the stereo speakers 104 (S603). When determining the received speech data signal to be associated with the data communication, the CPU 106 stores that signal in the memory 109 (S604). When the operation keypad 110 is used to enter an instruction to reproduce the stored speech data signal, the CPU 106 performs processing to reproduce the speech data signal stored in the memory 109 from the stereo speakers 104 (S605).

As mentioned above, the incoming phone-call speaker can be also used as the musical sound speaker. As a result, the cellular phone terminal itself can be miniaturized to decrease the power consumption and costs.

For example, it is obvious that available forms of the data communication in the present specification can include: receiving speech signals from the other cellular phones and the like via a base station; downloading music, image, or video contents via networks (Internet home pages and the like); receiving data from external storage media; and directly receiving data from another information processing terminal via an infrared data communication port or the like.

In the above-mentioned example, the CPU 106 temporarily stores the speech data signal in the memory 109 and does not perform reproduction until a reproduction instruction is issued. Like steaming, for example, it may be preferable to store data in the memory 109 and sequentially reproduce the stored data.

Further, types of the above-mentioned speech data signal may include any music-related data such as a ring melody, an MP3 file, a movie, a musical piece, a game, a TV program, a commercial message, an advertisement, image information (motion and/or still pictures) captured by an digital camera and provided with a speech signal, etc. It is also obvious that the wired or wireless communication may be available.

A sixth embodiment of the present invention will now be described. The block diagram for the sixth embodiment is the same as that in FIG. 1. The present embodiment is configured to automatically select the speech mode, the received sound volume, the call quality, etc. by using the distance sensor 202. It is assumed that the embodiment is configured to output a speech signal from the two stereo speakers 104 in the video telephone mode and reproduce a speech signal from the monaural speaker 201 in the normal call mode.

FIG. 8(1) shows the relationship between a distance and a speaker volume. As shown in FIG. 8(1), control is provided to decrease the volume of the monaural speaker 201 and increase the volume of the stereo speakers 104 as the cellular phone terminal is moved further away from the human body. Obviously, the human body here signifies a human being or an object and is not limited to the human body in a narrow sense.

FIG. 8(2) shows specific processing according to the present embodiment. First, the communicating party dials a telephone number using the operation keypad 110 or the like to start the communication (S801). The distance sensor 202 measures a distance between the human body and the cellular phone terminal (S802). According to the measured distance, the CPU 106 determines the call mode (S803). Based on the determined call mode, the CPU 106 selects the stereo speakers 104 or the monaural speaker 201 as a speaker to which a speech signal is output (S804). When the normal call mode is determined, for example, the CPU 106 selects the monaural speaker 201 as a speaker to which a speech signal is output. When the video telephone mode is determined, the CPU 106 selects the stereo speakers 104 as speakers to which a speech signal is output. Thereafter, for example, the CPU 106 adjusts a received sound volume for the speaker during the communication as shown in FIG. 8(1) (S805). When any of the communicating users issues an instruction to hang up, the call is finished (S806).

The call mode is determined with reference to a threshold value for the distance measured by the distance sensor 202 between the human body and the cellular phone terminal. When the distance is measured to be smaller than 5 cm, for example, the CPU 106 determines that the user makes a call in the normal call mode. When the distance is measured to be larger than or equal to 5 cm, the CPU 106 determines that the user makes a call in the video telephone mode.

In this manner, the present embodiment can determine each call mode based on the sensor. It is possible to eliminate unnecessary input operations and automatically provide an optimal volume level according to the distance between the user and the cellular phone, improving the usability.

The threshold value here is defined to be 5 cm but is not limited thereto. The threshold value may be user-definable. In this case, the specified data is stored in the memory 109. The CPU 106 just needs to reference this data to perform the processing as shown in FIG. 8(2), for example. Hence, the user can set a threshold value for determining the call mode, improving the usability.

There may be provided an "auto mode" that automatically adjusts the call mode and the call volume as mentioned above. It may be also preferable to allow the user to choose from the normal call mode, the video telephone mode, and the auto mode. A means for selecting the auto mode may be a special button on the operation key pad 110 or the display screen. Consequently, the user can select the "auto mode" according to situations, improving the usability.

Further, it is obvious that the distance sensor 202 used in the above-mentioned embodiment may be an infrared distance sensor, a distance sensor using other means such as an ultrasonic wave and the like, or an optical sensor. The distance sensor need not necessarily detect an accurate distance but may determine whether or not an object is detected at an approximate distance from the sensor. In addition, the arrangement of the sensor is not limited to the present embodiment.

Figure 9:
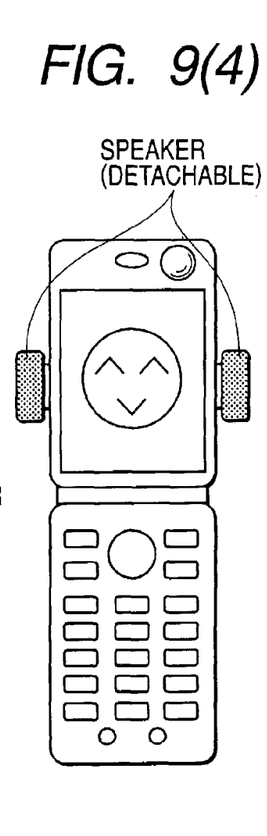

A seventh embodiment of the present invention will now be described. The seventh embodiment concerns arrangements and shapes of the stereo speaker 104. FIG. 9 shows examples of the embodiment. FIG. 9(1) shows an example of arranging the speakers on the side surfaces of the display section and in the case body. This example can contribute to slimming the cellular phone terminal and decrease costs and power consumption. FIG. 9(2) shows the speakers arranged on the left and right sides of the display section so that the speakers protrude from the case body. This example can increase the display screen size compared to the example in FIG. 9(1). In addition, a user can easily hear the sound from the cellular phone using the speakers protruding from the case body. FIG. 9(3) shows an example of the movable speakers that can change speaker directions by means of a connector section on the case body or move speaker positions by means of a sliding portion. This example makes it possible to change the speaker position or direction according to user preferences and fix the speaker direction independently of whether or not the case body is opened. The speakers may be configured to be contained in the cellular phone's case body. It is possible to normally place the speakers in the case body and take them out of the case body when a realistic call is needed. This example can improve the usability for users and protect the speakers. FIG. 9(4) shows an example of arranging the speakers so as to be detachable from the case body. In this case, docking holes are provided to allow the speakers to be detachable on the both sides of the case body. According to this configuration, incoming phone-call speakers can be easily replaced. The user can use favorite speakers for calling. FIG. 9(5) shows an example of providing the speakers on the hinge section for opening and closing the case body. This configuration can increase the display section 108 and the space for the operation key pad 110 compared to the example in FIG. 9(1).

Generally, the cellular phone's screen is vertically longer. As shown in FIG. 9(6), however, the cellular phone may be positioned sideways to use a horizontally longer screen for video telephone calling. In this case, arranging the speakers on the both sides of the display section 108 can establish a call with the wide screen and the realistic sound.

While FIG. 9(1) describes that the speakers are arranged on the side surfaces of the display section, the speakers need not strictly contact with the display section. The speakers may be arranged on the bottom of the display section 108 or above the top of the display section 108 as shown in FIG. 1(2). In FIGS. 9(1) through (4), the speakers are provided on the case body having the display section 108, but the present invention is not limited thereto. As shown in FIG. 9(7), the speakers may be provided on the case body having the operation keypad 110. In consideration for a wide range of stereo sound for calling as mentioned above, it is desirable to provide a certain interval between the left and right speakers. As shown in FIG. 9(8), the speakers 104 may be positioned to the end of the case body having the display section 108 and to the end of the case body having the operation keypad 110. This configuration can ensure a sufficient interval between the speakers to provide a more realistic call. On an ordinary folding cellular phone, it is difficult to almost flat open the case body having the display section 108 and the case body having the operation keypad 110. If the stereo speakers 104 arranged as shown in FIG. 9(8) output the sound in a direction almost perpendicular to the display surface and the operation surface (arrows with broken lines in FIG. 9(9), it is difficult to diffuse the sound from each speaker. FIG. 9(9) illustrates the cellular phone viewed from the left/right side surface. As indicated with arrows in full lines of FIG. 9(9), a more realistic call is available if the sound is output with directivity and the CPU 106 performs processing so that the sound can be output almost perpendicularly to the user. Moreover, it is obvious that the cellular phone may be configured to almost flat open the case body having the display section 108 and the case body having the operation keypad 110.

With respect to the microphone 101, for example, a docking hole may be provided to make the microphone detachable or to attach an external high-efficiency microphone. This makes it possible to choose microphones according to preferences of the user. A directional microphone may be used to effectively hear only a speech signal from a specified direction. According to the present invention, a plurality of microphones 101 needs to be provided. It is obvious that the present invention is not limited to the present embodiment also with respect to arrangements and shapes of the microphones.

It is also possible to connect a stereo headphone with microphone to the headphone jack 105 for making a call. In this case, the R' and L' data are received from the communicating party via the RF unit 107 and are decompressed to the R and L data in the speech data decompression section 103. Via the headphone jack 105, the R data is transmitted to the left side of the headphone and the L data is transmitted to the right side thereof. As a result, the user can enjoy a realistic call also using the headphone with microphone. Since the headphone is provided with a microphone, a handsfree telephone call is available, further improving the usability.

As mentioned above, the present invention can provide the cellular phone terminal capable of a realistic call.

The foregoing invention has been described in terms of preferred embodiments. However, those skilled, in the art will recognize that many variations of such embodiments exist. Such variations are intended to be within the scope of the present invention and the appended claims.

What is claimed is:

1. A cellular phone terminal capable of speech communication with an information processing terminal, comprising:
   a plurality of speakers for the speech communication;
   a receiver to receive a speech signal supplied by a plurality of microphones of the information processing terminal; and
   a processor to control each output of the plurality of speakers based on the speech signal received by the receiver, wherein
   the plurality of microphones are arranged on left and right sides of the information processing terminal and the plurality of speakers are arranged on left and right sides of a display section; and
   the processor provides control so that a left speaker of the cellular phone terminal outputs a speech signal which is supplied by a right microphone of the information processing terminal and is received by the receiver, and a right speaker of the cellular phone terminal outputs a speech signal which is supplied by a left microphone of the information processing terminal and is received by the receiver.

2. A cellular phone terminal, comprising:
   a selector to set a call mode to a video telephone mode or a normal call mode;
   a plurality of speakers for the speech communication;
   a receiver to receive a speech signal supplied by a plurality of microphones of an information processing terminal;
   a decompressor to decompress the speech signal received by the receiver; and
   a processor to provide control to allow the plurality of speakers to stereophonically output a speech signal decompressed by the decompressor when the selector sets the call mode to the video telephone mode.

3. A cellular phone terminal capable of speech communication with an information processing terminal, comprising:
   a plurality of speakers for the speech communication;
   a plurality of microphones to input a speech sound;
   a compressor to compress a speech signal supplied by the plurality of the microphones;
   a transmitter to transmit a speech signal compressed by the compressor to the information processing terminal;
   a receiver to receive a speech signal from the information processing terminal;

a decompressor to decompress a speech signal received by the receiver;

a processor to provide control to produce a speech signal decompressed by the decompressor; and a distance sensor to detect a distance between the cellular phone terminal and a human body, wherein the processor selects a call mode or a call format according to a distance detected by the distance sensor.

4. The cellular phone terminal according to claim 3, wherein the processor selects a normal call mode as the call mode when the distance detected by the distance sensor is determined to be smaller than a specified value and selects a video telephone mode as the call mode when the distance detected by the distance sensor is determined to greater than or equal to the specified value.

5. The cellular phone terminal according to claim 4, wherein the specified value is selectable.

6. The cellular phone terminal according to any of claims 2 and 3, wherein the plurality of speakers are movable via a connector section or a slider.

7. The cellular phone terminal according to any of claims 2 and 3, wherein the plurality of speakers are detachable via a docking hole.

8. The cellular phone terminal according to any of claims 2 and 3, wherein a first case body having a display screen and a second case body having an operation section are foldable at a hinge section; and at least one of the plurality of speakers is provided on the first case body and at least one of the plurality of speakers is provided on the second case body.

* * * * *